(No Model.)
J. OMHOLT.
APPARATUS FOR PRODUCING METALS BY MEANS OF ELECTROLYSIS.
No. 382,183. Patented May 1, 1888.
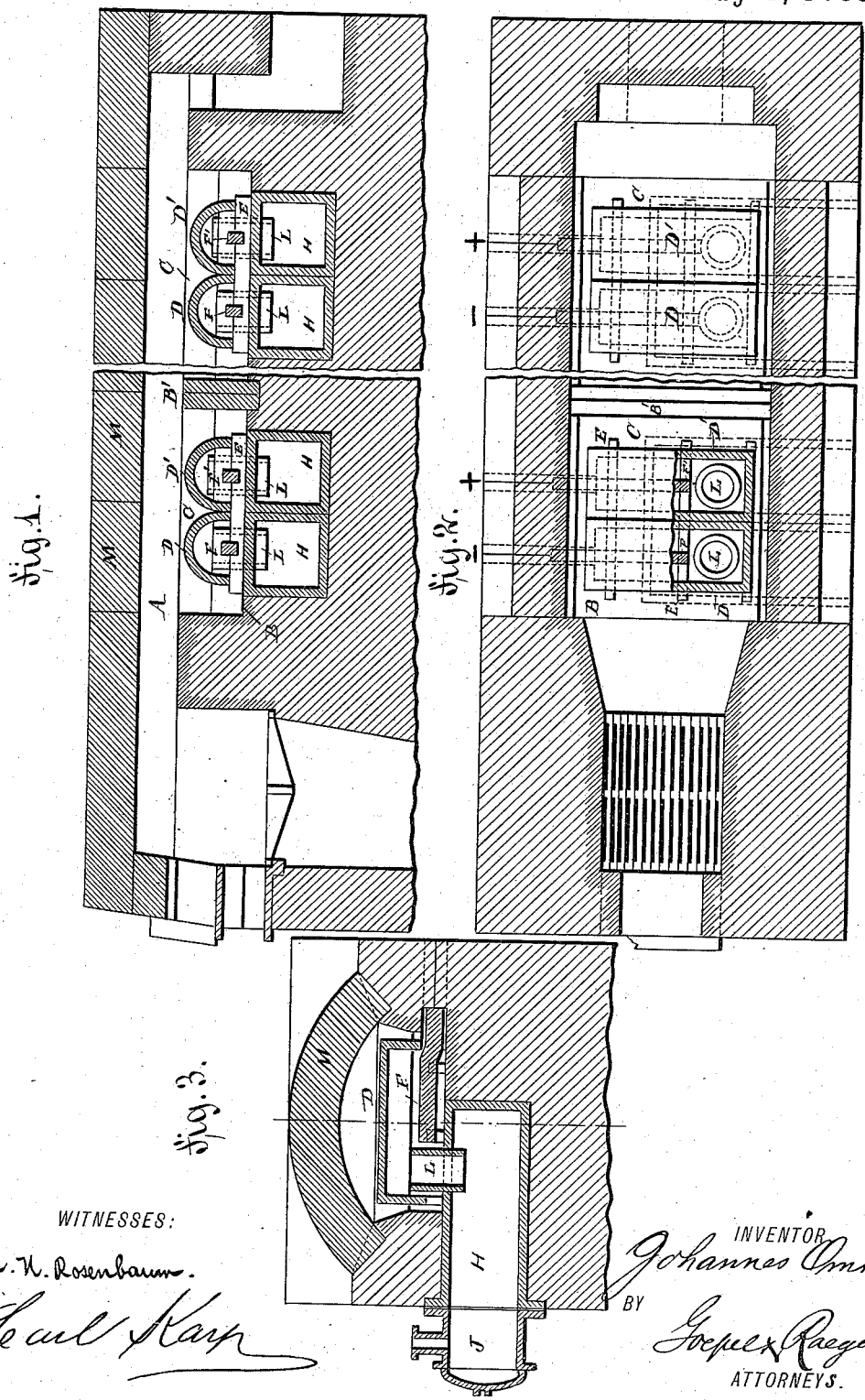
WITNESSES:
INVENTOR
Johannes Omholt
BY
ATTORNEYS.

United States Patent Office.

JOHANNES OMHOLT, OF GÖSSNITZ, SAXE-ALTENBURG, GERMANY, ASSIGNOR TO CHEMISCHE FABRIK GÖSSNITZ, BOTTIGER E SEIDLER, OF SAME PLACE.

APPARATUS FOR PRODUCING METALS BY MEANS OF ELECTROLYSIS.

SPECIFICATION forming part of Letters Patent No. 382,183, dated May 1, 1888.

Application filed February 17, 1886. Serial No. 192,208. (No model.) Patented in Germany June 6, 1885, No. 34,278; in France June 15, 1885, No. 169,562; in Belgium June 16, 1885, No. 69,294, and in England June 19, 1885, No. 7,510.

*To all whom it may concern:*

Be it known that I, JOHANNES OMHOLT, a subject of the King of Norway, residing at the city of Gössnitz, in the Duchy of Saxe-Altenburg, German Empire, have invented certain new and useful Improvements in Apparatus for Producing Metals by means of Electrolysis, (for which Letters Patent have heretofore been granted to me by the following governments: Germany, dated June 6, 1885, No. 34,278; Belgium, dated June 16, 1885, No. 69,294$^B$; France, dated June 15, 1885, No. 169,562; England, dated June 19, 1885, No. 7,510 of 1885,) of which the following is a specification.

The object of my invention is to provide a new apparatus for producing the so-called "light metals"—such as, for example, sodium, aluminium, magnesium, calcium, &c.—from their halogen combinations by means of electrolysis, in such a manner that the process can be carried on continuously and on a large scale at a comparatively low cost.

The invention consists in the combination, with a reverberatory or muffle furnace, of a series of half-retorts into which electrodes are placed, the said half-retorts being connected by suitable conductors with receptacles for the light metals or halogens separated during the operation, all as will be fully described hereinafter, and then pointed out in the claims.

In the accompanying drawings, Figure 1 is a longitudinal sectional elevation of my improved apparatus, parts being broken out. Fig. 2 is a sectional plan view of the same, parts being broken out. Fig. 3 is a cross-sectional view of the same.

Similar letters of reference indicate corresponding parts.

The reverberatory furnace A has its hearth B divided by one or more transverse partitions, B', into compartments C, which have no connection with each other. In each compartment I place two half-retorts, D D', parallel and adjacent to each other, on supporting-places E, of fire-proof material, placed on the floors of the compartments C, so that the bottom edges of said half-retorts will be a short distance from the floors of the compartments. The half-retorts D D contain the negative electrodes F F, and the half-retorts D' D' contain the positive electrodes F' F', the said electrodes resting on the supporting-pieces E E. The halogen combination, from which the light metals are to be produced, are in a molten state within the compartments C and completely cover the electrodes. The light metals which are separated from the halogen combinations at the negative electrodes, and the halogens separated at the positive electrodes, collect within the half-retorts. As the half-retorts, which are provided with end pieces, have their bottom parts immersed in the molten halogen combinations, the compartments formed within the half-retorts are sealed hermetically, and thus the light metals cannot be acted upon injuriously by the gases and products of combustion. The half-retorts are made of fire-proof material, and preferably provided with a lining containing carbon. The electrodes are composed of carbon or a suitable metal having an extremely high fusing-point, one end of which electrode being passed into the masonry of the furnace and connected with the conducting-wires, as shown, thus facilitating the removing or replacing of any of the electrodes without disturbing the rest, so that none of the light metals or halogens separated can collect and accumulate on the electrodes between the ends of the half-retorts and the side walls of the furnace. The electrodes are insulated by means of wire, brick, or other suitable insulating material.

Below each half-retort I provide a chamber, H, each of which is provided at its outer end with a detachable head or cap piece, J, which projects from the side of the furnace. A vertical conducting-tube, L, projects from each chamber H into the half-retort above it, the upper edges of said tubes or conductors L being a greater or less distance above the hearth of the furnace. The metals in the half-retorts D D collect on the upper surface of the molten mass within the chambers and pass through the tube or conductor L into the chamber or compartment H, either in a fluid state or as a gas, and are collected in suitable vessels placed within the chambers H and below the pipe L, which vessels can then be removed from the chambers H after the head or cap pieces J have been detached. The said chambers H are filled with some indifferent gas to prevent the atmospheric air from passing into the same and into the half-retort, as this would immediately cause the burning of the light metals. The tubes L in the half-retorts D' D', in which the halogens are collected, have their upper edges slightly above the level of the molten mass in the furnace, so as to prevent the molten mass from flowing through the tube L down into the chambers H. The halogens are collected from the chambers by means of suitable pipes.

The halogen combination can be conducted into the chambers of the furnace in a molten state or solid, and either continually or at intervals. In order to avoid dust, ashes, &c., being mixed with the molten mass, the furnace can be constructed as a muffle, or the required degree of heat may be produced by means of gas.

In order to facilitate the changing or renewing of half-retorts, the top of the furnace is preferably made of segmental blocks M of fire-bricks placed side by side. The halogen combinations referred to are combinations of chlorine, bromine, fluorine, &c., with sodium, strontium, magnesium, aluminium, &c.

I am well aware that light metals have been produced by means of electrolysis, and do not claim, broadly, to have invented this method of producing light metals.

I am also aware that apparatus has been used for the reduction of metals by electrolysis, said apparatus having independent tanks provided with electrodes and condensing apparatus and receptacles, and this I do not claim broadly.

I am also aware that the vapors of metals have been conducted to receptacles supplied with hydrogen or other suitable gas to prevent contact with the air.

Having thus described my invention, I claim as new and desire to secure by Letters Patent—

1. The combination, with a fire-box and a reverberatory chamber, of half-retorts on the floor of the reverberatory chamber and electrodes in the half-retorts, substantially as shown and described.

2. The combination, with a fire-box and a reverberatory chamber divided by partitions into compartments, of two half-retorts in each compartment and an electrode in each half-retort, substantially as shown and described.

3. The combination, with a fire-box and a reverberatory chamber, of supporting-pieces on the floor of the chamber, half-retorts on the supports, and an electrode in each half-retort resting on the supports, substantially as shown and described.

4. The combination, with a fire-box and a reverberatory chamber, of half-retorts in the chamber, the reverberatory chamber having a compartment below each half-retort, and a tube establishing communication between each half-retort and the compartment below it, substantially as shown and described.

5. The combination, with a fire-box and a reverberatory furnace, of half-retorts in the reverberatory chamber, electrodes in the half-retorts, a compartment below each half-retort, a tube establishing communication between each half-retort and its compartment, and a detachable cap or head piece on the outer end of each compartment, substantially as shown and described.

In testimony whereof I have signed my name to this specification in the presence of two subscribing witnesses.

JOHANNES OMHOLT.

Witnesses:
A. MÜHLE,
B. ROI.